United States Patent
Hikichi et al.

(10) Patent No.: US 7,878,292 B2
(45) Date of Patent: Feb. 1, 2011

(54) MOTORCYCLE STEERING SYSTEM

(75) Inventors: Toichiro Hikichi, Wako (JP); Satoru Kiyota, Wako (JP); Takuya Tagami, Wako (JP); Makoto Araki, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 141 days.

(21) Appl. No.: 12/292,436

(22) Filed: Nov. 19, 2008

(65) Prior Publication Data

US 2009/0194362 A1 Aug. 6, 2009

(30) Foreign Application Priority Data

Jan. 31, 2008 (JP) ............................. 2008-021575

(51) Int. Cl.
B62D 5/04 (2006.01)
(52) U.S. Cl. ..................... 180/442; 180/219; 180/222
(58) Field of Classification Search ................. 180/443, 180/444, 426, 439, 222, 223, 230, 219
See application file for complete search history.

(56) References Cited

U.S. PATENT DOCUMENTS

| | | | |
|---|---|---|---|
| 7,182,169 B2 * | 2/2007 | Suzuki | 180/426 |
| 7,604,084 B2 * | 10/2009 | Okada et al. | 180/443 |
| 7,661,506 B2 * | 2/2010 | Saito et al. | 180/444 |
| 2005/0257990 A1 * | 11/2005 | Shimizu | 180/444 |
| 2006/0065472 A1 * | 3/2006 | Ogawa et al. | 180/444 |
| 2006/0207824 A1 * | 9/2006 | Saito et al. | 180/444 |
| 2007/0175696 A1 * | 8/2007 | Saito et al. | 180/444 |
| 2009/0301804 A1 * | 12/2009 | Saito et al. | 180/444 |

FOREIGN PATENT DOCUMENTS

JP 2004-090716 3/2004

* cited by examiner

Primary Examiner—Lesley Morris
Assistant Examiner—Tashiana Adams
(74) Attorney, Agent, or Firm—Squire, Sanders & Dempsey L.L.P.

(57) ABSTRACT

A steering system includes a steering unit which can be configured to convert an operation input to an input shaft into an arbitrary amount of rotation or an arbitrary turning force and output the arbitrary amount of rotation or the arbitrary turning force from an output shaft. A steering handlebar can be configured to be coupled to the input shaft. A support bracket can be configured to be coupled to the output shaft and to support a front wheel of the vehicle. A housing can be configured to accommodate the steering unit. The steering unit can be configured to be mounted to a front end portion of a vehicle body frame of the vehicle integrally therewith by the housing.

20 Claims, 4 Drawing Sheets

MOTORCYCLE STEERING SYSTEM

BACKGROUND OF THE INVENTION

1. Field of the Invention

The present invention relates to a vehicle steering system, and more specifically to a vehicle steering system intended to dispose a vehicle steering mechanism efficiently.

2. Description of the Related Art

Conventionally, there is known a construction of a motorcycle steering system wherein a mechanism for improving the maneuverability of a handlebar is incorporated into a head pipe portion supporting the steering system at the front end of a vehicle body.

Patent document 1 (JP-A 2004-90716) generally discusses a steering system wherein a magnetic steering damper requiring no hydraulic fluid is incorporated into the steering system in such a manner that the steering damper surrounds the steering system.

As a mechanism for improving the maneuverability of a handlebar, a variable ratio steering mechanism and a power assist mechanism are known, for example. However, since these mechanisms tend to become more complicated in structure and occupy larger space to install than the steering damper as described above, it may be necessary to devise an installing method different from that as generally discussed in Patent document 1.

SUMMARY OF THE INVENTION

According to one embodiment of the invention, a vehicle steering system includes a front wheel and a rear wheel. The vehicle steering system includes a steering conversion mechanism configured to convert a rotary input to an input shaft into an arbitrary amount of rotation and/or an arbitrary turning force and output the arbitrary amount of rotation and/or the arbitrary turning force from an output shaft. The vehicle steering system also includes a steering handlebar configured to be coupled to the input shaft. The vehicle steering system includes a support portion configured to be coupled to the output shaft and to support the front wheel of the vehicle. The vehicle steering system also includes a housing configured to accommodate the steering conversion mechanism. The steering conversion mechanism is configured to be mounted to a front end portion of a vehicle body frame of the vehicle integrally therewith by the housing.

Further, according to another embodiment of the invention, the steering conversion mechanism is configured to be electrically driven.

Furthermore, according to another embodiment of the invention, the steering conversion mechanism includes an electric motor as each driving source.

Moreover, according to another embodiment of the invention, the steering conversion mechanism includes at least one of a variable ratio steering mechanism configured to convert an input steering angle to an input shaft caused by the steering handlebar into an arbitrary output steering angle and transmitting the input steering angle to the front wheel. A power assist mechanism is configured to supply an arbitrary supplementary power to an input operation to the steering handlebar.

According to a another embodiment of the invention, the housing is made of the material as that of the vehicle body frame.

According to another embodiment of the invention, an apparatus includes a converter configured to convert a rotary input to an input shaft into an arbitrary amount of rotation and/or an arbitrary turning force and output the arbitrary amount of rotation and/or the arbitrary turning force from an output shaft. The apparatus includes a handlebar configured to be coupled to the input shaft. The apparatus also includes a supporter configured to be coupled to the output shaft and to support a front wheel of the vehicle. The apparatus includes a housing configured to accommodate the converter. The converter is further configured to be mounted to a front end portion of a vehicle body frame of the vehicle integrally therewith by the housing.

Furthermore, according to another embodiment of the invention, an apparatus includes a converting means for converting a rotary input to an input shaft into an arbitrary amount of rotation and/or an arbitrary turning force and for outputting the arbitrary amount of rotation and/or the arbitrary turning force from an output shaft. The apparatus also includes a steering means for coupling to the input shaft. The apparatus includes a supporting means for coupling to the output shaft and for supporting a front wheel of the vehicle. The apparatus includes a housing means for accommodating the converting means. The converting means for converting is mounted to a front end portion of a vehicle body frame of the vehicle integrally therewith by the housing.

According to another embodiment of the invention, a method includes converting, using a converter, a rotary input to an input shaft into an arbitrary amount of rotation and/or an arbitrary turning force and outputting the arbitrary amount of rotation and/or the arbitrary turning force from an output shaft. The method includes coupling a steering handlebar to the input shaft. The method also includes coupling a support portion to the output shaft and supporting the front wheel of the vehicle using the supporting portion. The method includes configuring a housing to accommodate the converter. The method also includes mounting the converter to a front end portion of a vehicle body frame of the vehicle integrally therewith by the housing.

DESCRIPTION OF THE PREFERRED EMBODIMENTS

Figure 1:
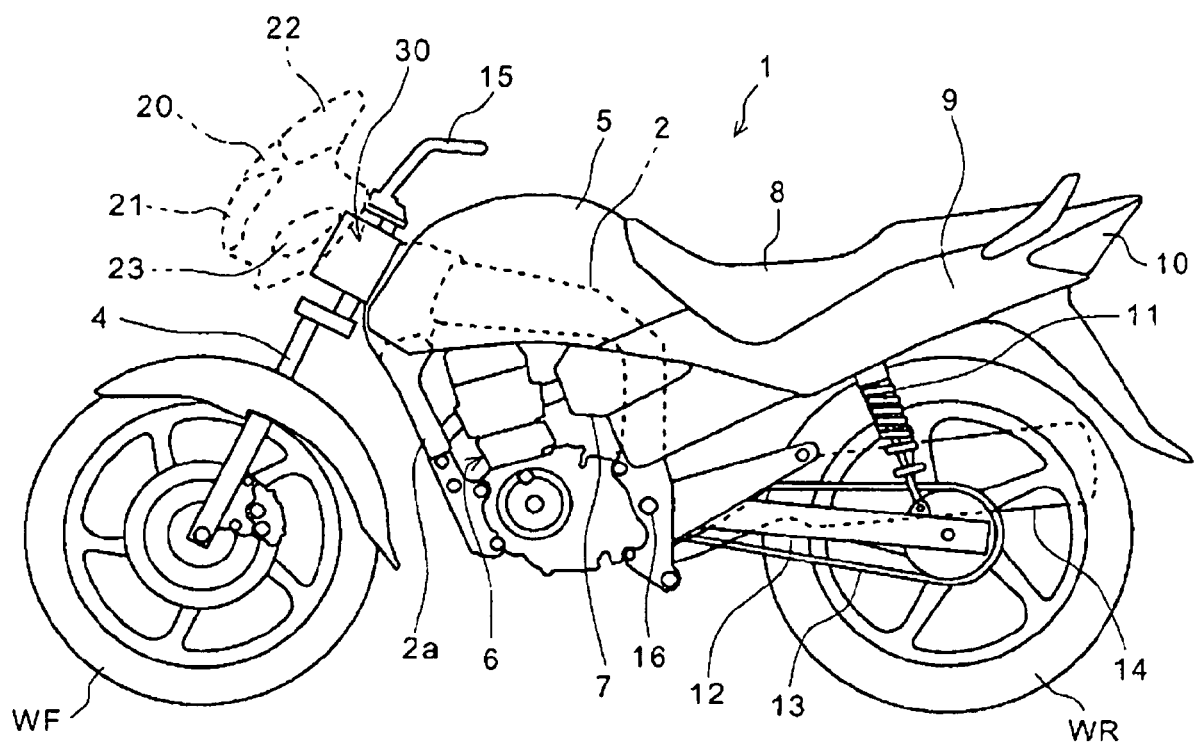
FIG. 1 is a side view of a motorcycle illustrating a steering system according to one embodiment of the present invention is applied.

Preferred embodiments of the present invention will be described below with reference to the drawings. FIG. 1 illustrates a side view of a motorcycle 1 to which a steering system 30 in one embodiment of the present invention is applied. A front wheel WF serving as a steered wheel of the motorcycle 1 can be rotatably journaled to a lower end portion of a front fork 4. The front fork 4 can be supported below the steering system 30 attached at a front end portion of a vehicle body frame 2 and above an under frame 2a. At the front side of the steering system 30 including a steering handlebar 15 steered by a rider, a front cowl 20 including a wind screen 22, a pair of left and right direction indicator lamps 23, and a headlight unit 21 are mounted.

Below the vehicle body frame 2 having the under frame 2a, an air cleaner 7 and an engine 6 can be suspended. Combustion gas from the engine 6 can be exhausted from a muffler 14 at the rear side of the vehicle. A swing arm 12 rotatably supporting a rear wheel WR can be suspended by a rear shock absorber 11 so as to be swingable about a pivot shaft 16. A rotary drive power from the engine 6 can be transmitted to the rear wheel WR by a drive chain 13. A fuel tank 5 can be mounted above the engine 6 and a seat 8 and a seat cowl 9 can be disposed behind the fuel tank 5. Further, at the rear end portion of the seat cowl 9, a tail lamp unit 10 formed integrally with a brake lamp and the direction indicator lamp can be mounted. The steering system according to this embodiment can be characterized in that a housing of the steering system 30 can be directly mounted to the front end portion of the vehicle body frame 2.

Figure 2:
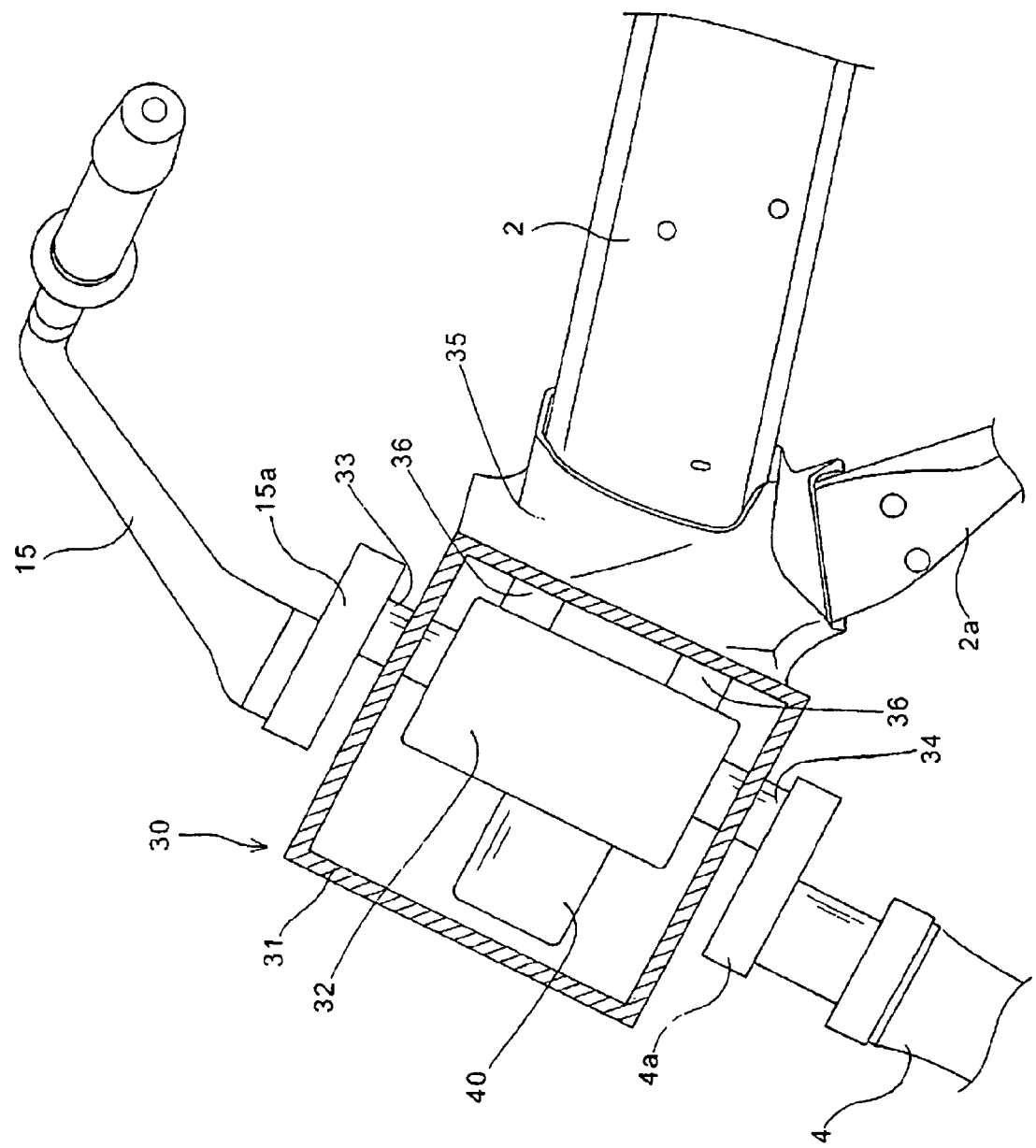
FIG. 2 is a partially-enlarged view of FIG. 1.
Figure 3:
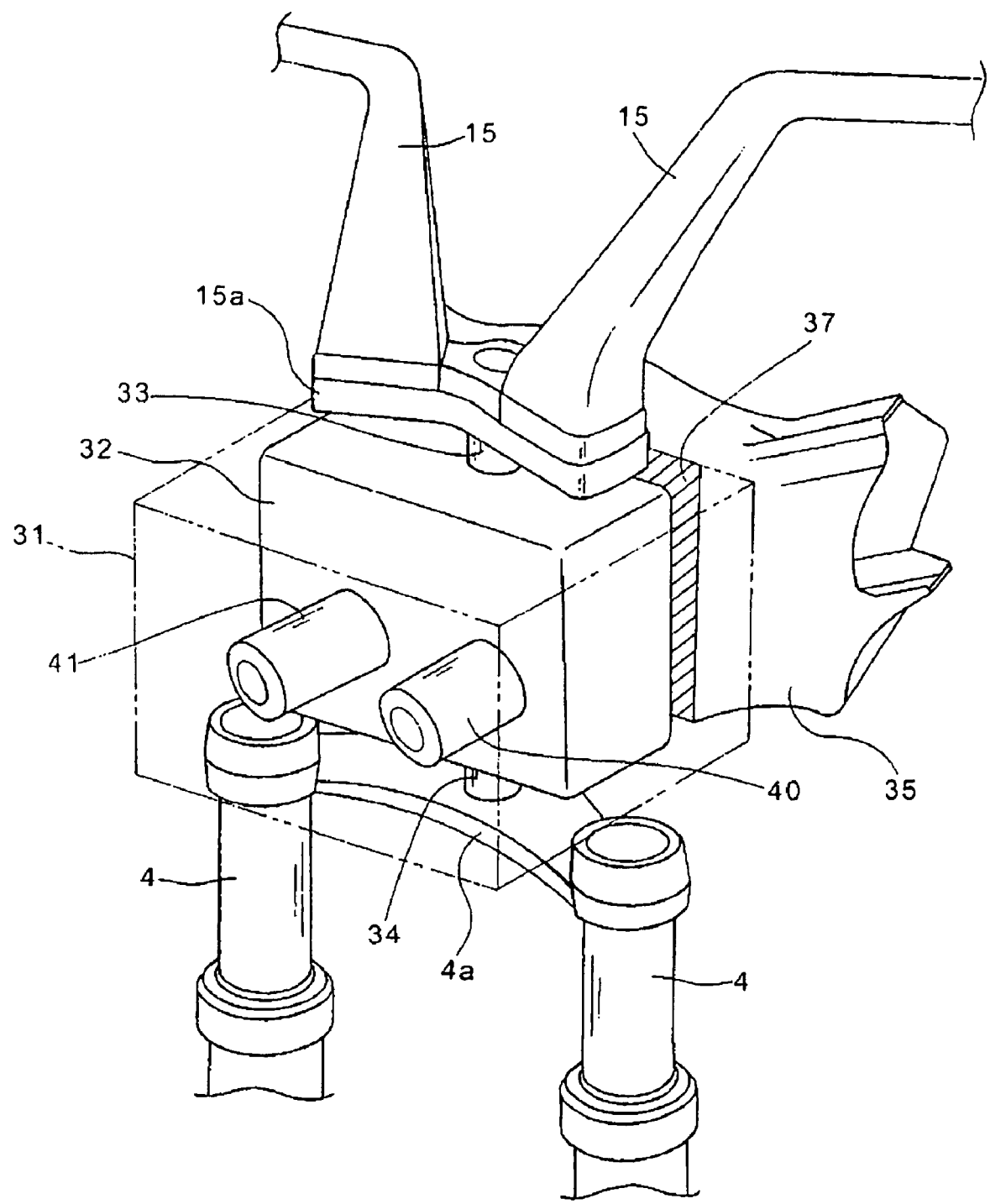
FIG. 3 is a perspective view illustrating the steering system.

FIG. 2 illustrates a partially enlarged view of FIG. 1. FIG. 3 illustrates a perspective view of the steering system 30. In the steering system 30 according to this embodiment, a steering unit 32 including integrally constructed variable ratio steering mechanism and power assist mechanism can be accommodated in a housing 31. The housing 31 made of metal or the like can be welded to a front portion 37 of a gusset 35 joining together the vehicle body frame 2 and the under frame 2a at the front end of the vehicle body. As a result, the steering system 30 can be fixed to the vehicle body of the motorcycle 1.

The steering unit 32 serving as a steering conversion mechanism can be fixed to an inside wall of the housing 31 by fixing extensions 36. An input shaft 33 can be provided at the upside of the vehicle body of the approximately rectangular steering unit 32. The upper end of the input shaft 33 projects out of the upper portion of the housing 31 and can be connected to a support bracket 15a for the steering handlebar 15. Also, an output shaft 34 can be provided at the downside of the vehicle body of the steering unit 32. The lower end of the output shaft 34 projects out of a lower portion of the housing 31 and can be connected to a support bracket 4a as a support section for the front fork 4.

The steering unit 32 includes a first motor 40 to drive the power assist mechanism and a second motor 41 to drive the variable ratio steering mechanism. The variable ratio steering mechanism can be a mechanism for causing the rotary angle of the input shaft 33 and that of the output shaft 34 to differ from each other at an arbitrary ratio by a drive power of the first motor 40. Stated another way, the variable ratio steering mechanism causes an input steering angle to the steering handlebar 15 and an output steering angle to the front wheel WF to differ from each other at an arbitrary ratio. The power assist mechanism can be a mechanism that makes it easy to turn the front wheel WF by supplying a supplementary power to the operation force of the rider to be input to the steering handlebar 15 by a drive power of the second motor 41. Stated another way, the power assist mechanism causes the output shaft 34 to have a steering force larger than operation force inputted to the input shaft 33.

As described above, in the steering system 30 according to this embodiment, since the housing 31 accommodating the steering unit 32 can be mounted at the front end portion of the vehicle body frame 2 integrally therewith, it may be possible to use the housing 31 as part of the vehicle body frame 2. As a result, the steering system 30 can allow the head pipe to be compact and highly rigid. Although the steering system 30 can be mounted to the vehicle body frame 2 by welding the housing 31 and the gusset 35 in this embodiment, fixing the housing 31 and the gusset 35 with bolts or the like may allow easy removal of the steering system 30 from the vehicle body frame 2 during an overhaul or the like. Further, by assembling in advance the steering system 30 having the housing 31 in which the steering unit 32 can be accommodated and then mounting the housing 31 to the vehicle body frame 2 to complete the vehicle assembly, the workability in assembling a vehicle body can be increased, as well as make the steering system and the vehicle body compact rather than installing a complicated mechanism onto the vehicle body at a later time.

Although the housing 31 can be mounted at a front end portion of the gusset 35 in this embodiment, it may be possible to form the housing 31 and the gusset 35 integrally and to join a rear end portion of the gusset 35 with the vehicle body frame 2. Also, in this embodiment, the housing 31 that is not turned even when the steering handlebar 15 is steered can be suitable for a base for mounting a headlight, cowling, and the like. Further, if the housing 31 is welded to the vehicle body frame 2, for example, making both parts of the same metal or the like can facilitate the rigidity calculation of the entire vehicle body frame when the housing 31 is designed as a rigid member of the vehicle body frame. Moreover, if the housing 31 is fixed to the vehicle body frame 2 with bolts or the like, it may be possible to make each part of a different material.

Figure 4:
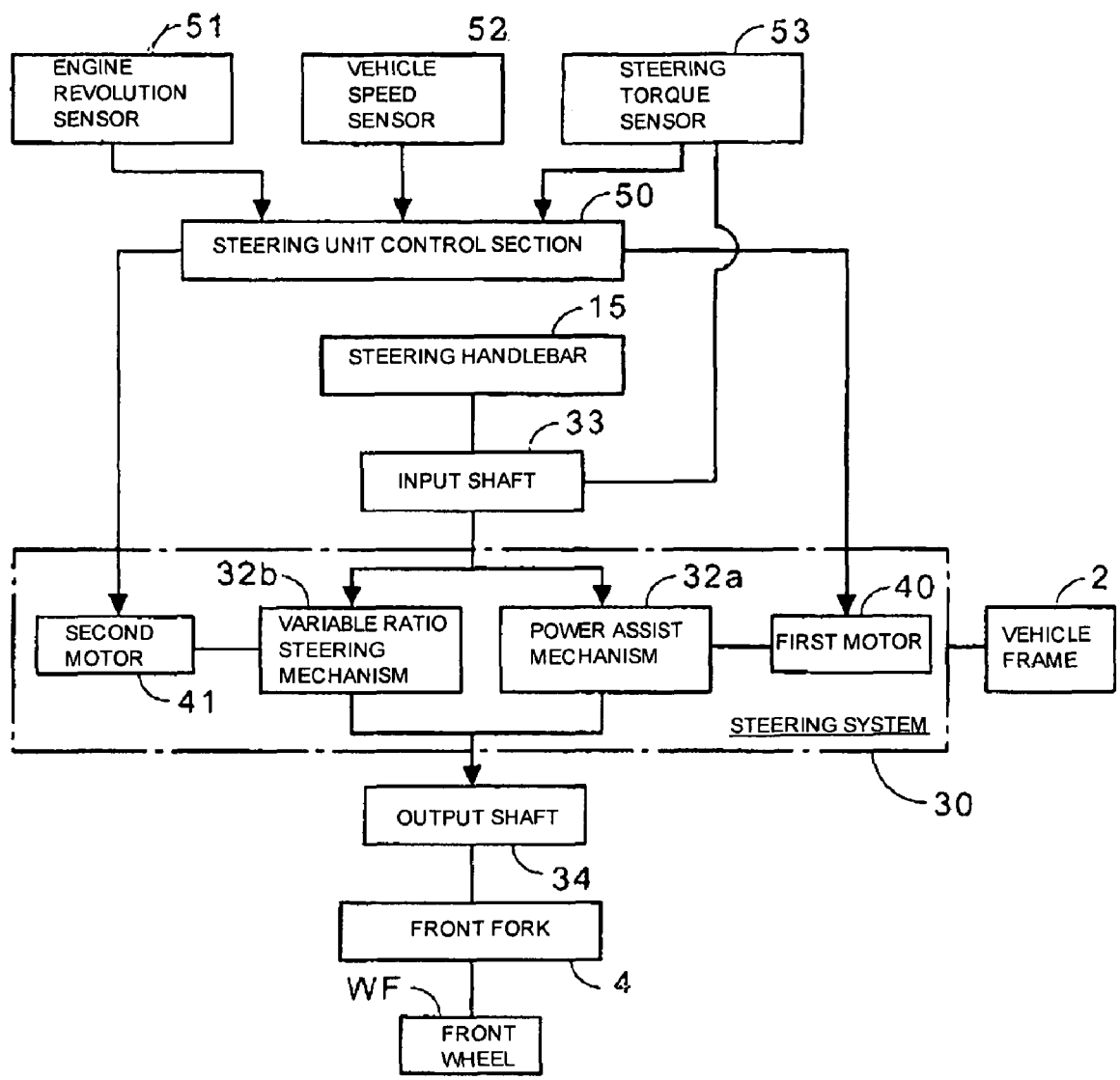
FIG. 4 is a block diagram illustrating the configuration of the steering system and peripheral equipment thereof.

FIG. 4 is a block diagram illustrating the configuration of the steering system 30 according to this embodiment and peripheral equipment thereof. The same numerals can be used to designate the same or equivalent parts. The first motor 40 to drive the power assist mechanism 32a and the second motor 41 to drive the variable ratio steering mechanism 32b can be respectively controlled by a steering unit control section 50 to develop a steering ratio and an auxiliary steering force suitable for the front wheel WF, based on the output signals from an engine revolution sensor 51, a vehicle speed sensor 52, and a steering torque sensor 53 to detect the operation force of the rider inputted to the steering handlebar 15. Also, sensor signals to be input to the steering unit control section 50 may include output signals from a bank angle sensor to detect the angle of inclination of a running vehicle and a rotary angle sensor to detect the rotary angles of the input shaft and output shaft.

In the steering system 30 according to this embodiment, since the steering system 30 and the vehicle body frame 2 can be separately and independently configured, it may be possible to mount the steering system 30 to the vehicle by fixing the housing 31 to a front end portion of the vehicle body frame 2. This facilitates the sharing of one type of steering system among a plurality of models with different vehicle body frames and the like. It may be possible to configure the settings of the steering unit 32 that differs with models by changing the input information to the steering unit control section 50. Also, the steering unit 32 includes a fail-safe function adapted to enable a normal operation of the handlebar in the event of a malfunction of some kind by equalizing the amount of rotation of the input shaft 33 and the output shaft 34.

The shape and material of the vehicle body frame, under frame, gusset, and housing, the construction and the like of the steering unit and the front fork are not limited to the embodiment described above and can be modified variously. For example, the steering conversion mechanism to be accommodated in the housing may be either one of the variable ratio steering mechanism and the power assist mechanism, and may include a hydraulic steering dumper mechanism or the like. Further, the vehicle body frame of the vehicle may be of various types such as a twin-spar type made of aluminum or a truss type made of iron pipe. The vehicle steering system according to the present invention may be applied to a three-wheeled vehicle and a four-wheeled vehicle in which a front wheel can be steered by a steering handlebar, as well as a motorcycle described above.

According to one of embodiment of the invention, since the housing accommodating the steering conversion mechanism can be mounted at the front end of the vehicle body frame integrally therewith, it may be possible to use the housing as part of the vehicle body frame. As a result, the steering system can allow a portion around the head pipe to be compact and highly rigid. Furthermore, in assembling a vehicle, since the housing accommodating the steering conversion mechanism can be assembled in advance and then mounted to the vehicle body frame to complete the assembly, workability in vehicle assembly can be increased as compared to installing a complicated mechanism onto the vehicle body a later time. This also makes it easier to share one type of steering system among a plurality of vehicle models whose vehicle body frames are different in shape and the like. Furthermore, if, for example the housing and the vehicle body frame are fixed together with bolts or the like, it may be possible to remove the steering system easily from the vehicle body frame during an overhaul or the like. Moreover, since the housing can be mounted to the vehicle body frame and is not turned even when the steering handlebar is steered, it may be easier to use the housing as a mounting base for a headlight, a cowling, or the like.

According to another embodiment of the invention, because the steering conversion mechanism can be electrically driven, it may be possible to materialize a vehicle steering system suitable for various electrical controls based on the output information from various sensors.

According to another embodiment of the invention, because the steering conversion mechanism can include an electric motor as each driving source, the entire steering conversion mechanism including the driving source may be accommodated in the housing. As a result, it may be easier to apply one type of steering system to a plurality of vehicle models.

According to another embodiment of the invention, the steering conversion mechanism includes at least one of the variable ratio steering mechanism to convert an input steering angle to the input shaft caused by the steering handlebar into an arbitrary output steering angle and transmits the input steering angle to the front wheel. The power assist mechanism can supply an arbitrary supplementary power to an input operation to the steering handlebar, and the steering mechanisms are concentrated at the front end portion of the vehicle body frame. As a result, the steering system is allowed to be compact and space-saving.

According to another embodiment of the invention, because the housing is made of same material as that of the vehicle body frame, it may be easy to fix the housing and the vehicle body frame together by welding or the like. Also, if the housing is designed as a rigid member of the vehicle body frame, it may be easier to make a rigidity calculation of the entire vehicle body frame.

The above-described embodiments are not the only form of the vehicle steering system according to the present invention. Various other configurations can be employed for the vehicle steering system without departing from the spirit and scope of the present invention.

The metes and bounds of the invention are defined only by the appended claims.

EXPLANATION OF REFERENCE NUMERALS AND LETTER

1 . . . Motorcycle
2 . . . Vehicle body frame
2a . . . Under frame
4 . . . Front fork
4a . . . Support bracket (support section)
15 . . . Steering handlebar
15a . . . Support bracket
30 . . . Steering system
31 . . . Housing
32 . . . Steering unit (steering conversion mechanism)
32a . . . Power assist mechanism
32b . . . Variable ratio steering mechanism
33 . . . Input shaft
34 . . . Output shaft
35 . . . Gusset
40 . . . First motor
41 . . . Second motor
WF . . . Front wheel

We claim:

1. A motorcycle steering system having a front wheel and a rear wheel, said system comprising:
a steering conversion mechanism configured to convert a rotary input to an input shaft into an arbitrary amount of rotation or an arbitrary turning force and output the arbitrary amount of rotation and/or the arbitrary turning force from an output shaft;
a steering handlebar configured to be coupled to the input shaft;
a support portion configured to be coupled to the output shaft and to support the front wheel of the motorcycle; and
a housing welded to a front portion of a gusset joining together a motorcycle body frame of the motorcycle and an under frame at a front end portion of the motorcycle, and configured to accommodate the steering conversion mechanism,
wherein the steering conversion mechanism is mounted to the front end portion the motorcycle body frame integrally with the housing, and
wherein the steering conversion mechanism includes at least one of
a variable ratio steering mechanism configured to convert an input steering angle to the input shaft caused by the steering handlebar into an arbitrary output steering angle and transmit the input steering angle to the front wheel, and
a power assist mechanism configured to supply an arbitrary supplementary force to an input operation to the steering handlebar.

2. The motorcycle steering system according to claim 1, wherein the steering conversion mechanism is configured to be electrically driven.

3. The motorcycle steering system according to claim 1, wherein the steering conversion mechanism includes an electric motor as a driving source.

4. The motorcycle steering system according to claim 1, wherein the housing comprises a same material as that of the motorcycle body frame.

5. An apparatus, comprising:
a converter configured to convert a rotary input to an input shaft into an arbitrary amount of rotation or an arbitrary turning force and output the arbitrary amount of rotation or the arbitrary turning force from an output shaft;
a handlebar configured to be coupled to the input shaft;
a supporter configured to be coupled to the output shaft and to support a front wheel of the motorcycle; and
a housing welded to a front portion of a gusset joining together a motorcycle body frame of the motorcycle and an under frame at a front end portion of the motorcycle, and configured to accommodate the converter,
wherein the converter is mounted to the front end portion of the motorcycle body frame integrally with the housing, and wherein the converter includes at least one of
- a variable ratio steering mechanism configured to convert an input steering angle to the input shaft caused by the handlebar into an arbitrary output steering angle and transmit the input steering angle to the front wheel, and
- a power assist mechanism configured to supply an arbitrary supplementary force to an input operation to the handlebar.

6. The apparatus according to claim 5, wherein the converter is configured to be electrically driven.

7. The apparatus according to claim 5, wherein the converter includes an electric motor as a driving source.

8. The apparatus according to claim 5, wherein the housing comprises a same material as that of the motorcycle body frame.

9. An apparatus, comprising:
- a converting means for converting a rotary input to an input shaft into an arbitrary amount of rotation or an arbitrary turning force and for outputting the arbitrary amount of rotation or the arbitrary turning force from an output shaft;
- a steering means for coupling to the input shaft;
- a supporting means for coupling to the output shaft and for supporting a front wheel of the motorcycle; and
- a housing means welded to a front portion of a gusset joining together a motorcycle body frame of the motorcycle and an under frame at a front end portion of the motorcycle for accommodating the converting means,
- wherein the converting means for converting is mounted to the front end portion of the motorcycle body frame of the motorcycle integrally with the housing, and
- wherein the converting means for converting includes at least one of
  - a variable ratio steering means for converting an input steering angle to the input shaft caused by the steering means into an arbitrary output steering angle and for transmitting the input steering angle to the front wheel, and
  - a power assist means for supplying an arbitrary supplementary force to an input operation to the steering means.

10. The apparatus according to claim 9, wherein the converting means for converting is electrically driven.

11. The apparatus according to claim 9, wherein the steering means for coupling to the input shaft includes an electric motor as a driving source.

12. The apparatus according to claim 9, wherein the housing means for accommodating comprises a same material as that of the motorcycle body frame.

13. A method, comprising:
- converting, using a converter, a rotary input to an input shaft into an arbitrary amount of rotation or an arbitrary turning force and outputting the arbitrary amount of rotation or the arbitrary turning force from an output shaft;
- coupling a steering handlebar to the input shaft;
- coupling a support portion to the output shaft and supporting the front wheel of the motorcycle using the supporting portion;
- welding a housing to a front portion of a gusset joining together a motorcycle body frame of the motorcycle and an under frame at a front end portion of the motorcycle;
- configuring the housing to accommodate the converter;
- mounting the converter to the front end portion of the motorcycle body frame of the motorcycle integrally with the housing;
- configuring the converter to include at least one of a variable ratio steering mechanism configured to convert an input steering angle to the input shaft caused by the steering handlebar into an arbitrary output steering angle and transmit the input steering angle to the front wheel; and
- supplying, using a power assist mechanism, an arbitrary supplementary force to an input operation to the steering handlebar.

14. The method according to claim 13, further comprising: configuring the converter to be electrically driven.

15. The method according to claim 13, further comprising: configuring the converter to include an electric motor as a driving source.

16. The method according to claim 13, further comprising: configuring the housing to comprise a same material as that of the motorcycle body frame.

17. The motorcycle steering system according to claim 1, wherein the steering conversion mechanism is fixed to an inside wall of the housing by fixing extensions.

18. The apparatus according to claim 5, wherein the converter is fixed to an inside wall of the housing by fixing extensions.

19. The apparatus according to claim 9, wherein the converting means is fixed to an inside wall of the housing by fixing extensions.

20. The method according to claim 13, further comprising: fixing the converter to an inside wall of the housing by fixing extensions.

* * * * *